United States Patent

Adamson et al.

[11] Patent Number: 5,332,633
[45] Date of Patent: Jul. 26, 1994

[54] CELL SEALANT

[75] Inventors: David V. Adamson, Surrey; Richard H. Dawson, Crawley, both of England

[73] Assignee: Duracell Inc., Bethel, Conn.

[21] Appl. No.: 33,663

[22] Filed: Mar. 16, 1993

[51] Int. Cl.$^5$ .................................................. H01M 2/08
[52] U.S. Cl. ..................................... 429/174; 429/185
[58] Field of Search ................................ 429/171–174, 429/185, 164, 165, 166, 206

[56] References Cited

U.S. PATENT DOCUMENTS

| | | |
|---|---|---|
| 3,922,178 | 11/1975 | Winger . |
| 4,224,736 | 9/1980 | Feldhake .................. 429/174 X |
| 4,282,293 | 8/1981 | Van Lier ..................... 429/185 |
| 4,618,547 | 10/1986 | Markin ......................... 429/174 |
| 4,740,435 | 4/1988 | Markin ......................... 429/174 |
| 4,816,355 | 3/1989 | Kulibert et al. ............ 429/174 |
| 4,992,343 | 2/1991 | Nardi ......................... 429/165 X |

*Primary Examiner*—Anthony Skapars
*Attorney, Agent, or Firm*—Ronald S. Cornell; Edward M. Corcoran; Barry D. Josephs

[57] ABSTRACT

The invention relates to sealant materials for sealing interfacial spaces within electrochemical cells. The sealant material is a thermoplastic block copolymer elastomer characterized by having at least two glass transition temperatures. The thermoplastic block copolymers form particularly useful sealants for a current collector nail which is inserted through an insulating closure member, such as a plastic grommet, used to close the open end of the cell.

18 Claims, 2 Drawing Sheets

CELL SEALANT

The invention relates to sealants for electrochemical cells, particularly elastomeric sealants in alkaline cells.

Conventional electrochemical cells, particularly alkaline cells, are sealed by employing an insulating closure member such as a plastic gasket or grommet. During cell assembly this member is placed in the open end of the cell casing and is crimped in place. A sealant material is typically applied between the closure member peripheral surface and the cell casing to assure that there is a tight seal therebetween and that no electrolyte material can escape. In alkaline cells an anode current collector, which is a conductive metallic nail or pin is normally inserted through the insulating closure member and into the anode active material. The nail penetrates through a pre-formed opening or insertion hole in the closure member so that the bulk of the nail lodges within the anode material. The opposite end of the nail is typically connected to the cell anode cap which forms the cell's anode terminal. Sealant material is also commonly applied around the nail insertion hole in the closure member to assure that electrolyte does not leak out of the cell at the interface between the nail shank and the closing member.

While a number of sealants have been found suitable for sealing the interspace between the closure member periphery and the cell casing, adequate sealant for the nail insertion hole has been more difficult to find. Sealants which may work perfectly well in sealing the interspace between the closure member and cell casing may not perform well in sealing the nail insertion hole. This difference may be due in part to the greater friction or abrasion that occurs between the nail surface and the closure member as the nail is tightly forced into the insertion hole. There is no such abrasion between the closure member and cell casing. Another difference is that the mechanism believed to be responsible for the sealant degradation in each location is not identical. For example, there is electrochemical activity at the surface of brass current collector nails, which is not present in the interspace between the closure member and cell casing. Such activity is believed to promote degradation of many types of conventional sealants. For example, one suitable sealant, a fatty polyamide, for the closure member periphery is disclosed in U.S. Pat. No. 3,922,178. This sealant, however, can fail when applied to the nail insertion hole irrespective of the material employed for the closure member. The electrochemical activity occurring at the surface of the current collector nail is believed to promote degradation of the sealant disclosed in this reference.

The electrochemical activity at the surface of the current collector causing sealant degradation can be a function of the current collector material. Brass, for example, a very desirable anode current collector material, nonetheless, may promote sealant degradation because of the electrochemical activity of the zinc present in the brass material (Brass is an alloy typically containing 70% copper and 30% by weight zinc. It is known to plate at least a portion of such brass current collectors with metals such as lead and indium to inhibit gassing). Also under elevated temperatures alkaline electrolyte tends to migrate up the surface of the current collector nail, as by capillary action, and eventually contact the sealant. Since sealants such as polyamide sealants degrade when exposed to the electrolyte in the presence of electrochemical activity at the surface of the current collector, the sealant gradually becomes depleted from the area where it is needed. Corrosion of the current collector, particularly in "zero added mercury" cells, can occur under elevated temperature conditions and may also contribute to the depletion of the sealant around the nail insertion hole.

This phenomenon of sealant depletion occurs with other conventional cell sealants as well. In general it has been very difficult to find a suitable sealant for the nail insertion hole which is easy to prepare and apply, has the requisite sealing and rheological properties and is resistant to electrochemical attack for the life of the cell.

U.S. Pat. No. 4,618,547 discloses a leak resistant nontacky sealant for cells generally for application to the insulating closure member, typically a plastic gasket or grommet as above referenced, to assure that electrolyte does not leak from the cell through or around the closure member. The disclosed sealant comprises a solvated mixture of a castable, film-forming thermoplastic material with a polymeric binder which is in liquid state at room temperature. The thermoplastic polymer may be selected from acrylic, nylon, polypropylene, polyethylene, and polvinylchloride. The polymeric binder is disclosed as a liquid at room temperature and can be selected from polybutene, polyisobutene, polybutadiene, carboxyl terminated polybutadiene and hydroxyl terminated butadiene.

U.S. Pat. No. 4,740,435 discloses sealant material generally for application to an insulating closure member in electrochemical cells, typically alkaline cells. The reference discloses the use of an rubber additives for the asphalt sealant in solvated mixture to make it more elastic without losing its adhesive properties. The elastomeric additive is disclosed as added in amount between 0.5% to 10% by weight of the asphalt. All of the sealant formulations discussed in.this reference include asphalt as a component.

U.S. Pat. No. 4,282,293 discloses the application of a substituted organo silane as sealant between the cell cover and gasket (closure member) at the open end of an alkaline cell, and then applying a layer of material selected from a polyamide, an epoxy resin, asphalt, and cured epoxy polyamide resin over the silane.

It is an object of the invention to provide a sealant material which can adequately seal interfacial spaces within the cell, particularly the interfacial space between the current collector nail and the nail insertion hole.

It is an object of the invention for the sealant to adequately seal interfacial spaces within the cell, even if the cell is exposed to hot, humid conditions.

It is desirable to provide a cell sealant which is easy to apply, is initially tacky but becomes flexible, and retains its flexibility and resists corrosion during the life of the cell.

The invention is better understood with reference to the following figures. While the following discussion is with specific reference to a nail-type current collector, the present invention encompasses other type elongated configurations such as the elongated rivet-type disclosed in U.S. Pat. No. 5,080,985 and the elongated configurations disclosed in U.S. Pat. Nos. 4,939,048 and 4,942,101. The present invention generally pertains to an effective sealant to be used in the interfacial region between a metal current collector and the adjacent surface of a feed-through hole in a plastic seating member.

Figure 1:
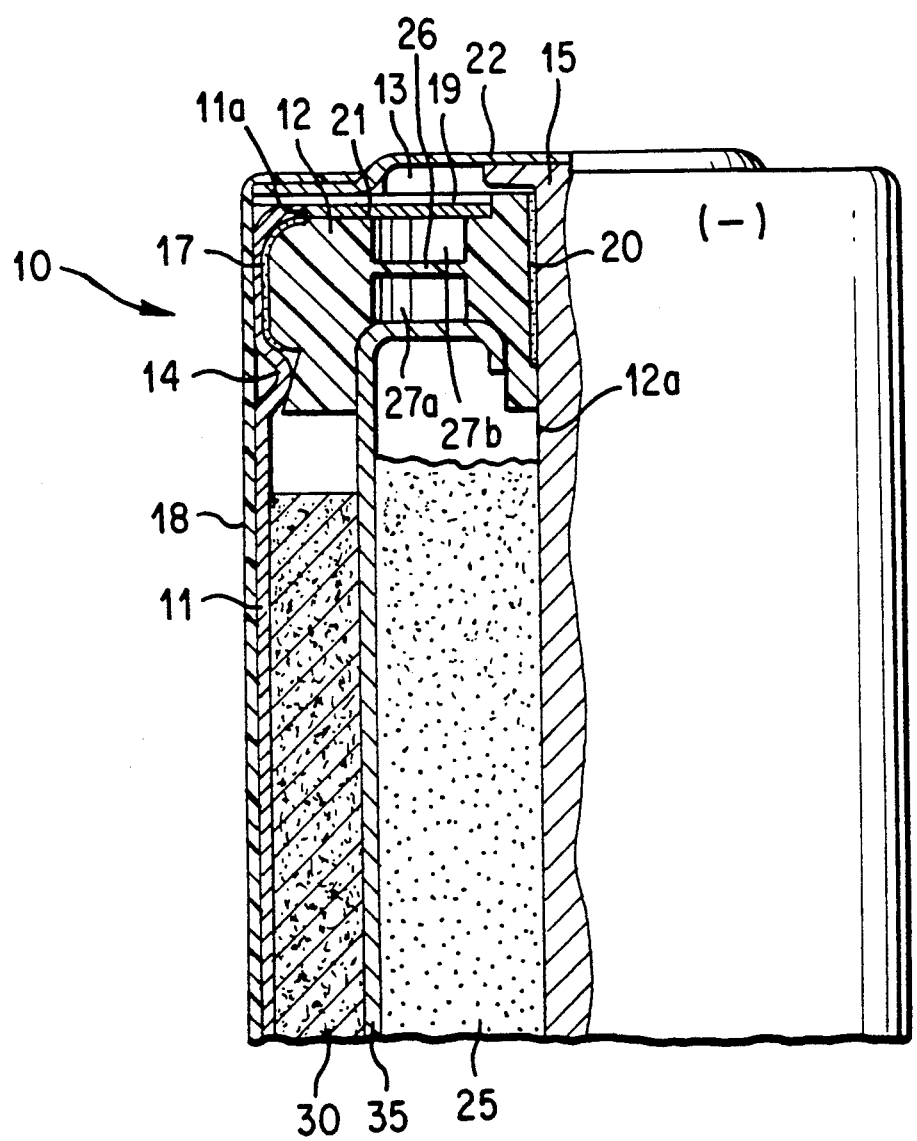
FIG. 1 is a partial sectional view of the sealing area of an alkaline cell showing application of the sealant of the present invention.

The sealing area of a representative cell is illustrated in FIG. 1. Cell 10 is formed of an open ended cylindrical container or casing 11, typically of steel, having an insulating closure member or plastic grommet 12 inserted in the container's open end 13. A thin insulator disc 19 is placed on top of closure member 12. A metallic support disc 21 is optionally placed between the insulator disc 19 and closure member 12. A film-label 18 is applied around container 11. The closure member 12, preferably a substantially inert plastic, is seated on bead 14 formed in the cell container 11 near its open end 13. Closure member 12 is typically of nylon, polyethylene, or polypropylene. A current collector nail 15 is inserted through hole 12a of the closure member 12. Current collector nail 15 is typically of brass. At least a portion of nail 15 penetrates into anode active material 25. (In other designs nail 15 may penetrate through opening 12a of closure member 12 and into the cathode active material 30.) Nail 15 makes contact at its opposite end with the anode (negative) terminal cap 22. A conventional separator 35, porous to electrolyte, separates the anode active material 25 from cathode active material 30. If cell 10 is an alkaline cell, the anode active material 25 typically contains alkaline electrolyte (normally potassium hydroxide). Within its structure closure member 12 typically contains a thin membrane 26 and adjacent cavities 27a and 27b. Membrane 26 is designed to rupture if gas pressure within the cell reaches a critical level. The end of container 11 is crimped over forming lip 11a which holds closure member 12 locked in place.

A conventional sealant 17 may be disposed around the peripheral surface of closure member 12 at the interface between closure member 12 and container 11 or, more preferably, the sealant of the invention may be employed. Conventional sealants include, but are not limited to asphalt sealants as discussed in U.S. Pat. No. 4,740,435; bitumen based sealants as discussed in U.S. Pat. No. 4,224,736; mixtures of thermoplastic polymers, for example polyethylene, polypropylene, and polyvinylchloride and polymeric binders as discussed in U.S. Pat. No. 4,618,547; or fatty acid polyamide sealants as discussed in U.S. Pat. No. 3,922,178, said references all being incorporated herein by reference.

While the foregoing conventional sealants are suitable for use as sealant 17, they are less desirable for use as sealant 20. However, the sealant material of the invention has particular utility if employed as sealant 20 to seal the interspace between current collector nail 15 and closure member 12 at opening 12a within the closure member. Seal 20 must be sufficiently strong and impervious to electrochemical or corrosive attack and prevent leakage of electrolyte contained in anode active material 25.

The sealant material of the invention for application to interfacial spaces in electrochemical cells, particularly to the current collector nail insertion hole 12a within the closure member 12 of such cells, may advantageously be selected from thermoplastic elastomers. Preferred thermoplastic elastomers for use in context with the present application are block copolymers characterized by having at least two glass transition temperatures. Examples of suitable thermoplastic block copolymer elastomers for the present application are, styrene-isoprene-styrene (SIS), styrene-butadiene-styrene (SBS), oil extended styrene-butadiene-styrene, styrene-ethylene/butylene styrene (S-EB-S) and styrene-ethylene/propylene styrene (S-EP-S) all of which are characterized by having at least two glass transition temperatures. These materials have thermoplastic and elastomeric characteristics and may be employed alone or in mixtures thereof. They resist attack by electrochemical activity which can occur at the surface of common current collector nails, particularly those of brass, and they do not dissolve in and are not attacked by alkaline electrolyte. They retain a soft, resilient state even when exposed to cold temperatures. They have been determined to be excellent sealants for interfacial spaces within electrochemical cells, especially for the interspace between current collector nail 15 (typically of brass) and the closure member 12. The sealant of the invention is also uniquely able to withstand increased amount of gassing in the cell and does not deteriorate even if the surface of the collector nail in contact therewith begins to corrode. They are distinguishable over other elastomeric copolymers having random monomer distribution and only one glass transition temperature, for example, randomly polymerized styrene-butadiene copolymer.

The thermoplastic block copolymers may be used alone or in mixture with one another. They are typically mixed or dissolved in a solvent base prior to application. The sealant material of the invention is initially a tacky material. It must be sufficiently fluid at time of application so that it may be easily and quickly applied. The sealant of the invention is typically applied in a solvent based mixture or solution. Advantageously, the viscosity level of the sealant-solvent solution may typically be between about 600 and 1200 centipoise at the time of application. The solvent quickly evaporates (in a matter of minutes) once the sealant is applied to the cell. As the solvent evaporates, the sealant becomes flexible and rubbery and remains so during the life of the cell, even if the cell is exposed to hot, humid conditions, for example, temperatures up to 60° C. and relative humidity typically up to 90%. The sealant also retains this texture in cold temperatures, e.g. temperatures as low as −30° C. Since the sealant material does not become hard and brittle, cracks or fissures in the material which could allow electrolyte to escape, cannot easily develop.

It is not necessary to add materials which are not block copolymers. However, modifiers may be added to modify or adjust the physical properties of the sealant. Such modifiers, for example, may be included to adjust mechanical properties or viscosity. For instance, mineral oil or comparable petroleum distillates can be added to modify viscosity during application. Polymeric resins such as polystyrene or polyamides can be added to increase tensile strength. Other modifying agents such as tackifying resins and antioxidants may also be added. Dyes may also be added to give the sealant color. When modifying agents are added, the thermoplastic block copolymers may comprise between about 51 and 100 weight percent of the sealant mixture, more typically between about 80 and 100 weight percent of the mixture and even more typically between about 85 and 100 weight percent of the mixture (compositions as calculated on solvent-free basis). Although modifiers may be added, the overall characteristics of the sealant generally will remain as above described.

Preferred thermoplastic block copolymers are 1) styrene-isoprene-stryrene block copolymer 2) styrene-butadiene-styrene block copolymer and 3) oil extended styrene-butadiene-styrene rubber. (The oil extended rubbers contain petroleum-based oils which are mixed in with the rubbers to make them more processible.) The preferred block copolymers may be represented by the general formula $(S-B)_nX$ type wherein S represents the polystyrene block, B the butadiene or polyisoprene block and X the coupling agent. These block copolymers have styrene end blocks. Such thermoplastic block copolymers are available commercially as EUROPRENE SOL T rubbers from EniChem Elastomers Ltd, England. The EUROPRENE SOL T materials are thermoplastic block copolymer elastomers (rubbers), further characterized by having two glass transition temperatures.

The preferred styrene-isoprene-styrene thermoplastic block copolymer is available commercially under the trade designation EUROPRENE SOL T193. It consists of styrene-isoprene-styrene rubber containing 25% bound styrene. The preferred styrene-butadiene-styrene thermoplastic block copolymer is available under the trade designation EUROPRENE SOL T166. It consists of styrene- butadiene-styrene rubber containing 30% bound styrene. A preferred oil extended styrene-butadiene-styrene rubber which is a thermoplastic block copolymer is available under the trade designation EUROPRENE Sol T176. It contains 55% bound styrene and is available under the trade designation Sol T176. Another preferred oil extended styrene-butadiene-styrene rubber which is a thermoplastic block copolymer contains 30% bound styrene and is available under the trade designation EUROPRENE Sol T172. These EUROPRENE thermoplastic rubbers are typically available in the form of white flakes which are readily dissolved in trichloroethane or toluene to form a clear liquid solution. This enables easy application of the sealant in liquid form.

All of the above listed thermoplastic copolymers have been determined to provide an excellent and durable sealant 20 for the nail insertion hole 12a within closure member 12. These materials have been discovered to provide a more effective seal during the cell life, especially under elevated temperature and humidity conditions than prior art cell sealants heretofor employed. The most preferred sealant material of those thermoplastic copolymers above listed is the styrene-isoprene-styrene copolymer EUROPRENE SOL T193 from EniChem Elastomers, Ltd.

The following test results demonstrates the superiority of the sealants of the invention as used in current collector nail insertion hole 12a compared to a well known conventional sealant for the same purpose. All units are in weight or weight percent unless otherwise indicated.

EXAMPLE 1

Three preferred sealant materials of the invention are prepared. These materials are: a) styrene-isporene-styrene rubber containing 25% bound styrene (SOL T193 from EniChem) dissolved in trichloroethane, b) oil extended styrene-butadiene-styrene rubber that contains 30% bound styrene (SOL T172 from EniChem) dissolved in trichloroethane, and c) styrene-butadiene-styrene rubber that contains 30% bound styrene (SOL T166 from EniChem.) dissolved in trichloroethane. For comparative purposes a fourth sealant d) a conventional fatty polyamide sealant of the type described in U.S. Pat. No. 3,922,178 (VERSAMIDE resin General Mills Chem. Co.) total solids 52% dissolved in trichloroethane and propan-2-ol) is prepared. Enough solvent is added to the solids in each case to yield a viscosity of the mixture between about 600 and 1200 centipoise.

Conventional $Zn/MnO_2$ alkaline cells (size AAA) are constructed containing zinc anode active material, manganese dioxide cathode active material and aqueous potassium hydroxide electrolyte (40% KOH solution) added to the zinc anode active material.

During construction of the alkaline cells each of the four sealants a, b, c and d above described is applied, respectively, to the anode collector nail insertion hole 12a of a like AAA size cell. Before application of these latter four sealants a metal support disc 21 is applied over closure member 12 and an insulator disc 19 is applied over support disc 21. The insulator disc and support disc each have an opening through their center which is in alignment with the nail insertion hole 12a in closure member 12. (Closure member 12 is of polypropylene in each case and the insulator disc 19 is a thin wax coated Kraft heavy cardboard.) Each of the latter four sealants is applied at ambient temperature to the nail insertion hole 12a of the respective cells. At the time of application the sealant has a viscosity of about 900 centipoise and is fluid enough that it may be dispensed by a metered pump. A brass current collector nail 15 is then inserted into the insertion hole 12a of the respective cells. The sealants of the invention (unlike most conventional sealants employing polyamides or asphalt) all have the additonal desirable property that they do not smear or leave a residue on the nail as the nail is pushed through the hole. The sealants of the invention are tacky when applied. When the solvent evaporates from sealants (a), (b) and (c) they each become adhesively bonded to the collector nail 15 and closure member 12 and become resilient and rubbery to the touch. When the solvent evaporates from the conventional polyamide sealant (d), the sealant reverts to a highly viscous fluid. The cells are then closed in conventional manner by crimping the open end forming lip 11a (FIG. 1).

In a test run each of the above referenced sealants a, b, c and d is applied as sealant 20, respectively, to the nail insertion hole in four groups of like $Zn/MnO_2$ (AAAsize) alkaline cells. Each of the four group contains 100 cells. The sealants are applied in the manner above described. The cells are otherwise conventional as above described and contain a polypropylene closure member 12 and a brass collector nail 15. Each cell also contains a second sealant, namely a conventional polyamide sealant 17 at the interface between the closure member 12 and casing 11. Sealant 17, as applied, is composed of VERSAMIDE resin total solids 52 percent by weight dissolved in trichloroethane and propan-2-ol. Each group of cells is then tested for leakage. In conducting the test the cells are first stored in an oven at 71° C. for 7 days. They are then placed in a controlled environmental chamber which is maintained at a fixed temperature of about 60° C. and 90% relative humidity for 28 days. The cells are then left to stand at ambient temperature of about 21° C. for seven days. The cells are then visually inspected for the appearance of any leakage.

Figure 2:
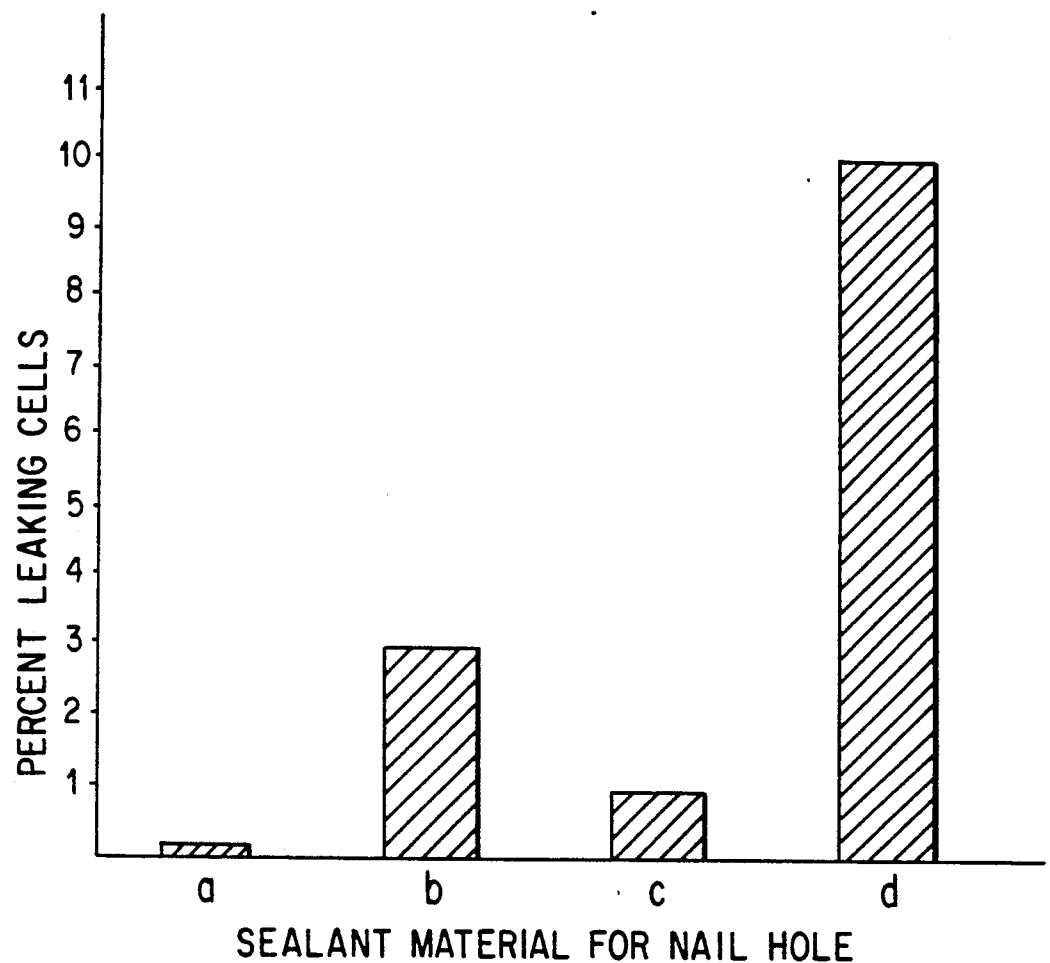
FIG. 2 is a graphical representation of the percentage of leaking cells under harsh environmental conditions employing the sealants (a), (b) and (c) of the invention for the current collector nail insertion hole compared to conventional sealant (d).

The results of the test are reported in FIG. 2. It may be seen that far fewer leakages around the nail insertion hole, by percent of cells examined, are reported for the cells with the sealant materials of the invention (a), (b), and (c) as compared to the conventional polyamide sealant (d). Additionally, it is apparent from the results that the sealant material (a) which is the styrene-isoprene-styrene rubber exhibited the best performance, since cells containing this sealant had the lowest percentage of leaking cells, namely less than about 0.2% in each run. All of the cells in each of the four groups are also examined for leakage at the second sealing location, namely, at the interface between closure member 12 and cell casing 11, which location contains polyamide sealant 17. There is no discernible leakage discovered in any of the cells at the second sealing location.

The sealant of the invention is generally suitable for any conventional primary or secondary (rechargeable) cell, for example zinc-carbon primary cells containing ammonium chloride electrolyte and nickel-cadmium or nickel-metal hydride rechargeable cells. Although the invention has been described with respect to specific embodiments, it should be appreciated that other embodiments are possible without departing from the scope and concept of the present invention. The invention, therefore, is not intended to be limited to the specific embodiments described herein.

What is claimed is:

1. An electrochemical cell comprising an open ended cell casing; an anode active material; a cathode active material; a separator; and an electrolyte disposed in operative association within the cell casing; a closure member closing said open end; and a current collector member extending through an opening in said closure member so that a portion of the current collector penetrates into one of the anode and cathode active materials, wherein an interface is formed between the current collector member and the closure member; said cell further comprising a sealant material located within said interface, said sealant material consisting essentially of thermoplastic elastomeric material selected from the group consisting of styrene-isoprene-styrene (SIS), styrene-butadiene-styrene (SBS), oil extended styrene-butadiene-styrene, styrene-ethylene/butylene-styrene (S-EB-S), styrene-ethylene/propylene-styrene (S-EP-S) and mixtures thereof.

2. The electrochemical cell of claim 1 wherein the thermoplastic elastomeric material consists essentially of one or more thermoplastic block copolymers each characterized by having at least two glass transition temperatures.

3. The electrochemical cell of claim 2 wherein the thermosplastic block copolymers are selected from the group consisting of styrene-isoprene-styrene (SIS) and styrene-butadiene-styrene (SBS) and mixtures thereof.

4. The electrochemical cell of claim 2 wherein the thermoplastic block copolymer is styrene-isoprene-styrene.

5. The electrochemical cell of claim 1 wherein the current collector member is an elongated member comprising brass.

6. The electrochemical cell of claim 1 wherein the anode active material includes electrolyte comprising potassium hydroxide and said current collector is a nail, a portion of which penetrates the anode active area.

7. The electrochemical cell of claim 1 wherein the closure member comprises a plastic grommet comprising polyproplene.

8. An electrochemical cell comprising an open ended cell casing; an anode active material; a cathode active material and an electrolyte disposed within the cell casing; a closure member closing said open end; and a current collector member extending through an opening in said closure member so that a portion of the current collector penetrates into one of the anode and cathode active materials; wherein a first interface is formed between the current collector member and the closure member and a second interface is formed between said closure member and the casing; said cell further comprising a first sealant material located within said first interface; said first sealant material consisting essentially of thermoplastic elastomer selected from the group consisting of styrene-isoprene-styrene block copolymer and styrene-butadiene-styrene block copolymer and mixtures thereof.

9. The electrochemical cell of claim 8 further comprising a second sealant material located within said second interface, said second sealant material comprising material other than a thermoplastic elastomer.

10. The electrochemical cell of claim 8 wherein the second sealing material comprises material selected from the group consisting of asphalt, bitumen, and polyamide, polyethylene, polypropylene, and polyvinylchloride.

11. The electrochemical cell of claim 8 wherein the thermoplastic elastomer is styrene-isoprene-styrene block copolymer.

12. The electrochemical cell of claim 8 wherein the current collector member is an elongated member comprising brass.

13. The electrochemical cell of claim 8 wherein the anode active material includes electrolyte comprising potassium hydroxide and a portion of the current collector penetrates the anode active material.

14. The electrochemical cell of claim 8 wherein the closure member comprises a plastic grommet.

15. An electrochemical cell comprising an open ended cell casing; an anode active material; a cathode active material and an electrolyte disposed within the cell casing; a closure member closing said open end; and a current collector member extending through an opening in said closure member so that a portion of the current collector penetrates into one of the anode and cathode active materials; wherein a first interface is formed between the current collector member and the closure member and a second interface is formed between said closure member and the casing; said cell further comprising a first sealant material located within said first interface; said first sealant material comprising a thermoplastic elastomer selected from the group consisting of styrene-isoprene-styrene block copolymer and styrene-butadiene-styrene block copolymer and mixtures thereof, said thermoplastic elastomer comprising between about 80 and 100 percent by weight of the first sealant material (as calculated on a solvent-free basis).

16. The electrochemical cell of claim 15 wherein the thermoplastic elastomer comprises between about 85 and 100 percent by weight of the first sealant material (as calculated on a solvent-free basis).

17. The electrochemical cell of claim 15 further comprising a second sealant material within said second interface, said second sealant material selected from the group consisting of asphalt, bitumen, and polyamide, polyethylene, polypropylene, and polyvinylchloride.

18. The electrochemical cell of claim 15 wherein the current collector member is an elongated member comprising brass.

* * * * *